UNITED STATES PATENT OFFICE.

EDWIN E. GLASKIN, OF BOSTON, MASSACHUSETTS, ASSIGNOR OF TWO-THIRDS HIS RIGHT TO EUGENE F. DALY, OF NEW YORK, N. Y.

IMPROVEMENT IN ASPHALT PAVEMENTS.

Specification forming part of Letters Patent No. 156,152, dated October 20, 1874; application filed October 2, 1874.

*To all whom it may concern:*

Be it known that I, EDWIN E. GLASKIN, of Boston, in the county of Suffolk and State of Massachusetts, have invented a new and Improved Asphalt Pavement; and I do hereby declare that the following is a full, clear, and exact description of the same.

My invention relates to employing, for pavements and roof-coverings, an asphalt rock, similar, in some respects, to the European asphalts heretofore used for a like purpose. The principal outcrops of this rock or material are found in the Grand Manitoulin Islands (in Canada West) belonging to the Clinton formation of the lower silurian group, and is a finely-granular asphaltic dolomite, which, by proper manipulation, can be manufactured into all the various forms of paving, roofing, &c., to which the European asphalts have or may be applied, and with equal or superior durability.

In order that others may be enabled to prepare this material, I will proceed to describe my preferred method of manufacture.

I am aware that "shales," and the so-called "bituminous" crystalline limestone of the Niagara formation, found near Chicago, and in other places, have been the subject of patents heretofore, especially in combination with various foreign materials, such as sand, quartz, clay, &c., to give body to, or to add to, the hardness of the resulting composition; but in the above instances, I hold that the bituminous matter has not been absorbed by the rock itself, but has simply gravitated through the cracks or interspaces of the stone, and that for paving purposes is no better than would be crushed ordinary limestone, mechanically incorporated with melted bitumen, sand, clay, &c., at similar temperatures. Neither can disintegration occur in these bituminous limestones by the action of heat alone, except at such high temperatures as will entirely destroy the bitumen and convert the stone into lime.

This peculiar soft dolomite used by me has absorbed petroleum at some remote period, which, during the lapse of ages, has become oxidized, or more viscid; consequently, when heated in a caldron, it gradually disintegrates or crumbles, similarly to the Val de Travers asphalts, although, to hasten this result, I usually add a small quantity of maltha, and heat to nearly 300° Fahrenheit for about three hours, when, the maltha having been absorbed by the asphaltic inductor, the material will have assumed a granular, pasty condition, but too viscid for most purposes, except by a long continuation of a higher temperature, and unless intended to be used in the form of powder. It is, therefore, advantageous and economical to add a composition, which I manufacture by dissolving equal parts of albertite coal and maltha at a temperature of 300° Fahrenheit, the proportion of this mixture being about fourteen per cent. of the disintegrated stone, and to this I preferably add three per cent. of finely-powdered sesquioxide of iron, although success may be obtained without it. The whole mass is then raised to a temperature of about 460° Fahrenheit, and kept stirred constantly for at least an hour, until the whole has become thoroughly homogeneous, when I add such quantities of the asphaltic rock itself as shall bring the composition to the desired consistency, according to its intended use. The material is now ready for immediate application *in situ*, and, being spread by any suitable means upon the bed or surface prepared for it, it forms, in due time, a hard, durable pavement. It may also be poured into molds for transportation, and reheated to prepare it for use.

The final proportion of the completed material would be very nearly eighty-eight parts of the asphaltic dolomite to twelve parts of the bituminous matrix, and three parts of the sesquioxide of iron, when the latter is incorporated, these proportions giving me the most satisfactory results, although I do not restrict myself exactly thereto, and, in case the inconvenience of procuring the albertite coal renders its use disadvantageous, similar proportions of solid bitumen may be substituted without the production of inferior material.

Having thus described my invention and process of manufacture, what I claim as novel is—

1. The process of forming the material for roofs and pavements, consisting in subjecting the asphaltic dolomite herein described to the action of heat, then adding maltha or oxidized petroleum and albertite coal, as set forth.

2. In continuation of the process, the addition, to the compound formed of the described rock, maltha, or oxidized petroleum, and albertite coal, of sesquioxide of iron, as described, and for the purpose set forth.

3. In continuation of the process, the addition to the compound formed of the specified proportions of the dolomite rock, maltha, and albertite coal, of a portion of said rock itself, to give the required consistency to the plastic mass, as set forth.

EDWIN E. GLASKIN.

Witnesses:
C. SEDGWICK,
T. B. MOSHER.